No. 737,097. PATENTED AUG. 25, 1903.
J. J. GUIDINGER.
HAY RACK.
APPLICATION FILED JULY 11, 1903.
NO MODEL.

Witnesses.
O. H. Keeney
Anna F. Schmidtbauer

Inventor.
John J. Guidinger
By Kendrick & Morsell
Attorneys.

No. 737,097. Patented August 25, 1903.

UNITED STATES PATENT OFFICE.

JOHN J. GUIDINGER, OF NEWTON, WISCONSIN.

HAY-RACK.

SPECIFICATION forming part of Letters Patent No. 737,097, dated August 25, 1903.

Application filed July 11, 1903. Serial No. 165,044. (No model.)

*To all whom it may concern:*

Be it known that I, JOHN J. GUIDINGER, residing in the town of Newton, in the county of Manitowoc and State of Wisconsin, have invented a new and useful Improvement in Hay-Racks, of which the following is a description, reference being had to the accompanying drawings, which are a part of this specification.

My invention relates to an improved hay-rack for use on a wagon or analogous vehicle for receiving and carrying hay, straw, or similar material thereon; and the invention is directed to the production of an improved hay-rack of simple but strong and enduring construction that can be inexpensively made and that is built of such material and so formed and provided with connecting and binding devices that the hay-rack can be quickly and readily put onto the running-gear of a wagon or analogous vehicle and the parts can be easily and securely fastened together even by a boy, so as to form an assembled hay-rack on the vehicle ready for carrying a load and adapted to be as readily and easily disassembled and removed from the vehicle, and when so removed is capable of being packed and stored away in an exceedingly compact form. Other benefits growing out of my improved construction are incidental thereto or to its value as an improved construction.

The invention consists of the hay-rack, its parts and combinations of parts, as herein described and claimed, or the equivalents thereof.

Figure 1:
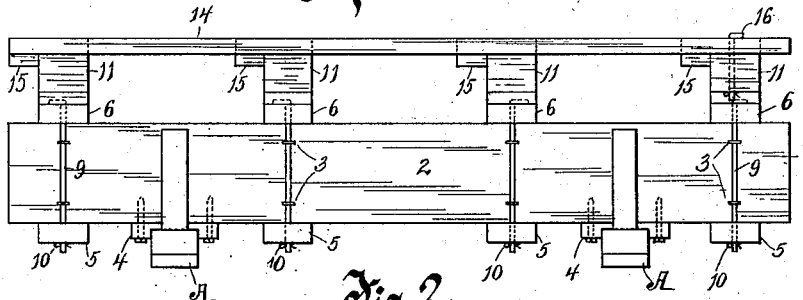
Figure 2:
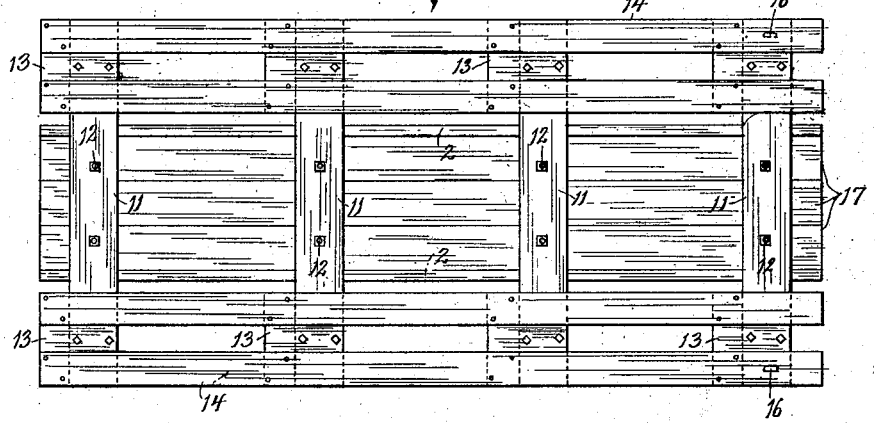
Figure 4:
Figure 3:
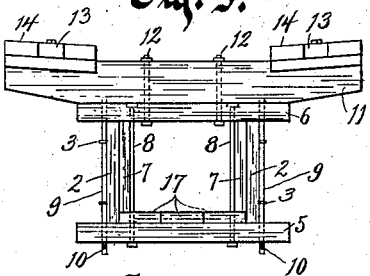
Figure 5:
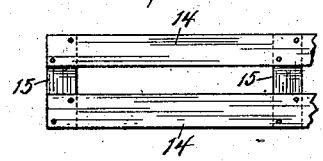
Figure 6:
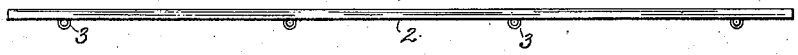
Figure 7:
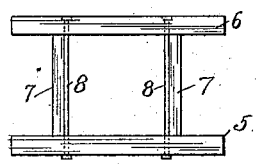

Figure 1 represents a side elevation of my improved rack on the bolsters of a wagon. Fig. 2 is a top plan view of the improved hay-rack. Fig. 3 is an end view of the improved rack. Fig. 4 is a detail of the construction, one member being in cross-section. Fig. 5 is a top plan view of a fragment of the top rails at one side of the rack. Fig. 6 is a top view of the edge of one of the side boards. Fig. 7 is a front view of one of the cross-frames forming a part of the hay-rack.

In the drawings, A A represent the bolsters of a wagon with their standards, on which bolsters the hay-rack in Fig. 1 is placed, indicating the manner of use of my improved hay-rack with a vehicle. The hay-rack employs side boards 2 2 of such length and height and thickness of material as is best adapted for the vehicle with which the hay-rack is to be used and the loads that will be put thereon. These side boards are provided with a plurality of sets of staples 3 3, fixed in the side boards on the outer surface thereof, the staples of each set being arranged one above the other in substantially vertical line and at such points in the length of the side board as cross-frames are located in the rack. These side boards, especially if it is desired to elevate the rack a little more than the width of the side boards would elevate it above the bolsters, may have blocks 4 4 bolted to their lower edges at the points where the side boards would rest on the bolsters, and these blocks may be recessed in their under surfaces to receive the bolsters therein, so that the side boards will be prevented from being shifted endwise on the vehicle. A plurality of cross-frames are employed, four being shown in the drawings, which severally consist of a bottom bar 5 and top bar 6 and two intermediate uprights 7 7, secured together advisably by means of nails or screws and also advisably by means of binding-bolts 8 8 through the top and bottom bars just inside of the uprights 7 7.

In assembling the parts of this hay-rack on a vehicle the side boards are first placed in position on the bolsters, and the cross-frames are then inserted between the side boards at substantially equal distances apart, the two outer cross-frames being placed near the respective front and rear ends of the side boards. Thereupon clamping-rods 9 9 are inserted in apertures therefor through the top and bottom bars 6 and 5 and medially through the sets of staples 3 3. The clamping-rods are provided with heads that rest on the tops of the top bars 6 and at their lower ends are secured releasably in place conveniently by keys 10 10. By this means the cross-frames and side boards are secured to each other and in position on the bolsters.

On each of the cross-frames a cross-bar 11 is placed, which cross-bar projects at each end a distance beyond the side boards and beyond the ends of the top bar 6. The cross-bar 11 in each instance is secured to its cross-frame by means of binding-bolts 12 12 through the cross-bar and the top bar of the cross-frame. Each of the cross-bars is provided with a transverse cleat 13, secured to its top surface, one near each end of the cross-bar and projecting therefrom advisably toward the front. The cleat is fastened to the cross-bar by any convenient means, as bolts or screws. These cleats are for securing the side rails to the cross-bars, as hereinafter described.

Two sets of side rails are provided for the rack—one set at each side thereof—each of which sets of rails consists of the longitudinal flat rails 14 14, arranged opposite and parallel to each other at a little distance apart and secured to each other in sets by means of the cross-ties 15 15, the cross-ties equaling in number the number of the cross-bars and being so disposed on the side rails and secured thereto on the under side of the rails that one cross-tie will when the side rails are in place on the cross-bars come immediately in front of each of the cross-bars and under a cleat 13. The side rails are to be placed in position on the cross-bars by resting a set of the rails on the ends of the cross-bars in such position that they can be pushed backwardly on the cross-bars, and the cross-ties will pass under the cleats 13 when thus pushed rearwardly. Thereupon the side rails are secured in place by locking bolts 16 16 through one of the rails of each set and through a cross-tie, advisably the rear cross-tie. By this means the side rails are secured detachably in position on the cross-bars against displacement either forward or back or laterally and in such manner as to be readily detached when desired.

The rack may be provided with longitudinal bottom boards 17 17, placed on the bottom bars 5 5 of the cross-frames, and this bottom may be employed with the complete hay-rack or may be used only in connection with the side boards and cross-frames, the cross-bars and side rails being removed by taking out the binding-bolts 12 12.

What I claim as my invention is—

1. A hay-rack, comprising side boards provided with rod-receiving staples, cross-frames having top and bottom latterally-projecting bars between which the side boards fit, clamping-rods through the top and bottom cross-frame bars and through the staples in the side boards, cross-bars on and secured detachably to the cross-frames, and side rails on the cross-bars.

2. In a hay-rack, side boards provided with rod-receiving staples, cross-frames having top and bottom laterally-projecting bars and intermediate uprights against which the side boards face, and clamping-rods through the top and bottom bars of the cross-frames and medially through the staples in the side boards.

3. In a hay-rack, side boards, cross-frames mounted on and between the side boards, means securing the side boards and the cross-frames detachably to each other, cross-bars mounted on the cross-frames and provided with projecting cleats, sets of rails one set at each side the rails of each set being separated from each other and secured together by cross-ties adapted to take under the cleats and to bear against the sides of the cross-bars, and means adapted to lock the side rails in position detachably in engagement with the cleats.

4. In a hay-rack, cross-bars provided with forwardly-projecting cleats, sets of side rails each set of rails consisting of two parallel rails at a little distance apart and connected together by as many cross-ties on their under surface as there are cross-bars, said cross-ties being adapted to take under the cleats, and means for locking the side rails on the cross-bars in engagement with the cleats.

In testimony whereof I affix my signature in presence of two witnesses.

JOHN J. GUIDINGER.

Witnesses:
J. P. NOLAN,
VICTOR J. NOLAN.